(12) United States Patent
Brown et al.

(10) Patent No.: US 10,146,472 B2
(45) Date of Patent: *Dec. 4, 2018

(54) TERTIARY STORAGE UNIT MANAGEMENT IN BIDIRECTIONAL DATA COPYING

(71) Applicant: International Business Machines Corporation, Armonk, NY (US)

(72) Inventors: Theresa M. Brown, Tucson, AZ (US); Nicolas M. Clayton, Warrington (GB); Theodore T. Harris, Jr., Tucson, AZ (US); Gregory E. McBride, Vail, AZ (US); Carol S. Mellgren, Tucson, AZ (US); Warren K. Stanley, Loveland, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/341,942

(22) Filed: Nov. 2, 2016

(65) Prior Publication Data

US 2017/0052710 A1    Feb. 23, 2017

Related U.S. Application Data

(63) Continuation of application No. 14/244,662, filed on Apr. 3, 2014, now Pat. No. 9,514,012.

(51) Int. Cl.
*G06F 11/00* (2006.01)
*G06F 3/06* (2006.01)
*G06F 11/20* (2006.01)

(52) U.S. Cl.
CPC ............ *G06F 3/065* (2013.01); *G06F 3/0619* (2013.01); *G06F 3/0683* (2013.01);
(Continued)

(58) Field of Classification Search
CPC ............ G06F 11/2079; G06F 11/2082; G06F 11/2058; G06F 11/2071; G06F 11/3006; G06F 3/0689; G06F 11/2076; G06F 3/065; G06F 3/067; G06F 11/1451; G06F 17/30578; G06F 17/30581; G06F 2201/855; G06F 2211/1035; G06F 1/2079
See application file for complete search history.

(56) References Cited

U.S. PATENT DOCUMENTS 7,188,272 B2    3/2007  Bartfai et al.
7,647,525 B2    1/2010  Lecrone et al.
(Continued)

OTHER PUBLICATIONS

U.S. Appl. No. 14/244,662, filed Apr. 3, 2014.
(Continued)

*Primary Examiner* — Jason B Bryan
(74) *Attorney, Agent, or Firm* — William K. Konrad; Konrad Raynes Davda & Victor LLP

(57) ABSTRACT

In one embodiment of the present description, mirroring is provided for a pair of storage units in bidirectional synchronous mirror relationships, and a tertiary storage unit. The mirroring includes multi-target mirroring to write updates written to the first storage unit to both the second storage unit and to a third storage unit. Similarly, for updates written to the second storage unit, multi-target mirroring is employed to write those to both the first storage unit and to the third storage unit. Other aspects are described.

21 Claims, 7 Drawing Sheets

(52) U.S. Cl.
CPC ...... *G06F 11/2058* (2013.01); *G06F 11/2079* (2013.01); *G06F 11/2076* (2013.01)

(56) References Cited

U.S. PATENT DOCUMENTS

| | | |
|---|---|---|
| 8,375,004 B2 | 2/2013 | Kondo et al. |
| 9,262,344 B2 | 2/2016 | Brown et al. |
| 2005/0193179 A1 | 9/2005 | Cochran et al. |
| 2006/0203718 A1 | 9/2006 | Benhase et al. |
| 2015/0286545 A1 | 10/2015 | Brown et al. |

OTHER PUBLICATIONS

Office Action dated Nov. 4, 2015, pp. 20, for U.S. Appl. No. 14/244,662, filed Apr. 3, 2014.
Response dated Feb. 4, 2016, to Office Action dated Nov. 4, 2015, pp. 20, for U.S. Appl. No. 14/244,662, filed Apr. 3, 2014.
Final Office Action dated May 16, 2016, pp. 14, for U.S. Appl. No. 14/244,662, filed Apr. 3, 2014.
Response dated Jul. 18, 2016, pp. 14, to Final Office Action dated May 16, 2016, pp. 14, for U.S. Appl. No. 14/244,662, filed Apr. 3, 2014.
Notice of Allowance dated Aug. 3, 2016, pp. 5, for U.S. Appl. No. 14/244,662, filed Apr. 3, 2014.
List of IBM Patents or Patent Applications Treated as Related dated Nov. 2, 2016. pp. 2.

TERTIARY STORAGE UNIT MANAGEMENT IN BIDIRECTIONAL DATA COPYING

BACKGROUND

1. Field

This description relates in general to distributed computing systems, and more particularly, to a method, system and computer program product for managing a tertiary storage unit in bidirectional data copying in a distributed computing system.

2. Description of Related Art

Data backup systems can provide continuous availability of production data in the event of a sudden catastrophic failure at a single point in time or data loss over a period of time. In one such disaster recovery system, production data is replicated from a local site to a remote which may be separated geographically by several miles from the local site. Such dual, mirror or shadow copies are typically made in a secondary storage device at the remote site, as the application system is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In data mirroring systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

Tivoli Productivity Center for Replication is an example of an application that customers may use to manage planned and unplanned outages. The Tivoli Productivity Center for Replication application can detect failures at the primary storage system which may be at a local site, for example. Such failures may include a problem writing or accessing primary storage volumes at the local site. When the Tivoli Productivity Center for Replication recovery application detects that a failure has occurred, it can invoke a multi-storage volume swapping function, an example of which is the IBM HyperSwap® function. This function may be used to automatically swap processing for all volumes in the mirrored configuration from the local site to the remote site. As a consequence of the swap, the storage volumes at the remote site which were originally configured as the secondary volumes of the original copy relationship, are reconfigured as the primary volumes of a new copy relationship. Similarly, the storage volumes at the local site which were originally configured as the primary volumes of the original copy relationship, may be reconfigured as the secondary volumes of the new copy relationship, once the volumes at the local site are operational again.

In some instances, it may be appropriate to copy a volume such as a secondary volume to a third volume (a tertiary volume). Thus, updates written to the primary volume, are mirrored to the secondary volume, and from the secondary volume to the tertiary volume, in a cascade arrangement. In this manner, the primary volume is a source volume to its target volume, the secondary volume, and the secondary volume is in turn a source volume to its target volume, the tertiary volume.

Should the tertiary volume lose data consistency with respect to the primary and secondary volumes, updates to the secondary volume may be suspended while the secondary volume and the tertiary volume are resynchronized using appropriate bitmaps. Bit maps may be used to map tracks of the tertiary storage volume which are out of sync with the corresponding tracks of the secondary volume, its source volume. Tracks which are out of synch may be resynchronized with a copy operation, copying data from the source track of the secondary volume to the out of sync target track of the tertiary volume.

Once the secondary volume and the tertiary volume have been resynchronized to contain the same data (often referred to as achieving "full duplex" status, updating of the secondary volume is resumed and the primary and secondary volumes may also be resynchronized. Any updates mirrored to the secondary volume are mirrored by the cascade to the tertiary volume. In this manner, the tertiary volume may be resynchronized to both the secondary and primary volumes.

Some storage mirroring systems permit a source volume to have more than one target volume. Thus, the secondary volume may, for example, have two target volumes, the tertiary volume and a fourth volume, a quaternary volume. Accordingly, updates written to the secondary volume may be mirrored to both the tertiary volume and the quaternary volume in a multi-target mirroring operation. In such an arrangement, the mirroring operation from the secondary volume to the tertiary volume occurs in parallel with the mirroring operation from the secondary volume to the quaternary volume. As a result, the data updates to the secondary volume are written in parallel to the tertiary volume and the quaternary volume, rather than in a cascade from the secondary volume to the tertiary volume and from the tertiary volume to the quaternary volume.

SUMMARY

In one aspect of the present description, operations and apparatus are described for managing a tertiary storage unit in bidirectional data copying in a distributed computing system wherein, in one embodiment, apparatus and operations are provided for writing updates to a first storage unit so that the first storage unit has updates prior to the second storage unit, writing updates to the second storage unit so that the second storage unit has updates prior to the first storage unit, multi-target mirroring updates written to the first storage unit, to both the second storage unit and a third storage unit, and multi-target mirroring updates written to the second storage unit, to both the first storage unit and the third storage unit.

Other embodiments, aspects and features are described herein.

DETAILED DESCRIPTION

Figure 1:
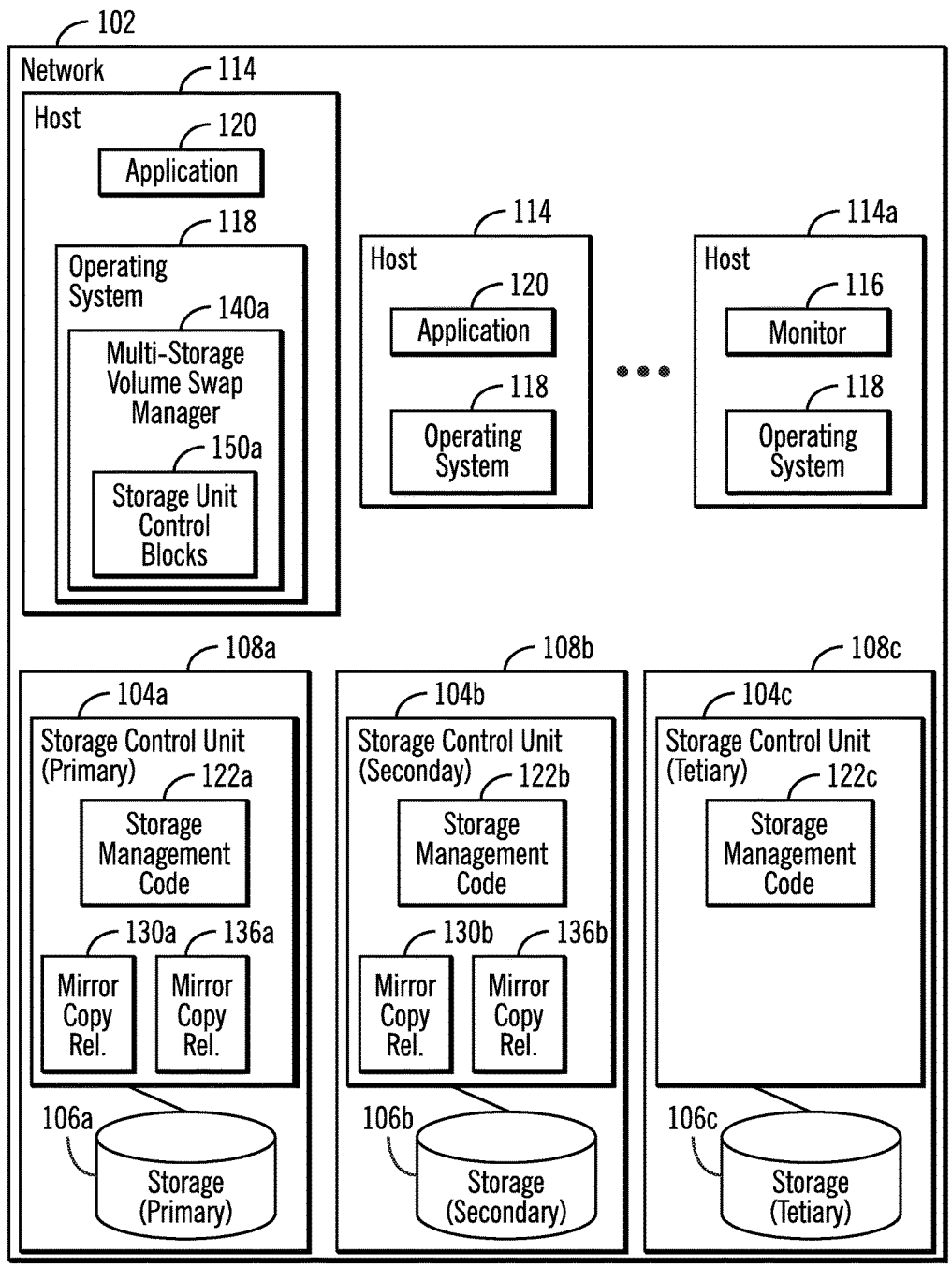
FIG. 1 illustrates an example of a network computing environment, employing tertiary storage unit management for bidirectional data copying in a distributed computing system in accordance with one embodiment of the present description.

FIG. 1 illustrates an embodiment of a network computing environment having a mirror relationship between source storage locations of a source storage subsystem at one site and target storage locations of a target storage subsystem at another site in the network computing environment or other data storage system. As explained in greater detail below, the network computing environment of FIG. 1 has copy management which facilitates creating and maintaining a tertiary mirror copy of storage units in a bidirectional mirror relationship.

Figure 2:
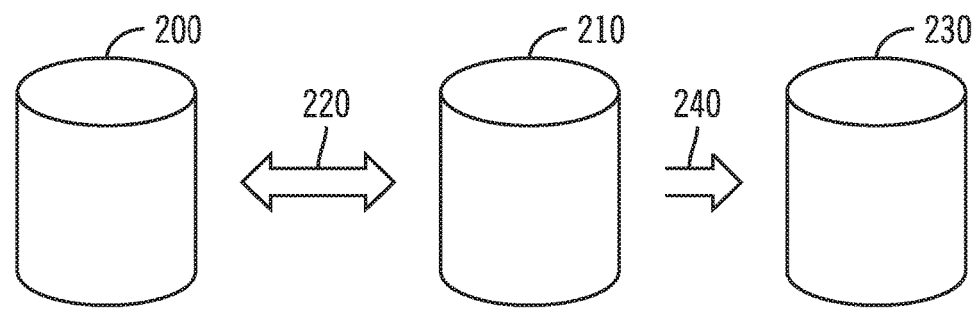
FIG. 2 illustrates a cascaded mirroring process.

FIG. 2 shows an example of two storage volumes 200, 210 which are in bidirectional synchronous mirror relationships as represented by the bidirectional mirroring operations indicated by bidirectional arrow 220. For example, storage volume 200 and storage volume 210 are both enabled for read and write operations. A data write to volume 200 updates volume 200 and that update is synchronously mirrored to storage volume 210. Conversely, an update to storage volume 210 is synchronously mirrored to storage volume 200.

In a bidirectional synchronous mirror environment, it may be useful to provide the ability to use a tertiary volume to recover lost data in the event of a disaster that affects the two volumes being bidirectionally mirrored to each other. In one approach, a third volume such as storage volume 230 is added in a cascade arrangement which cascades the added third volume from either of the two bidirectionally mirrored volumes. Such a cascade arrangement would allow the data on the third volume to be consistent with the data on the two bidirectionally mirrored volumes. Thus, if a third volume 230 were to be added in a cascade arrangement to volume 210 of FIG. 2, for example, an update to volume 200 would be mirrored to storage volume 210, and in turn mirrored to the added third volume 230 in a unidirectional mirror operation 240. However, in accordance with the present description, it is appreciated that such a cascade arrangement as depicted in FIG. 2 may adversely affect performance of the storage system.

Figure 3:
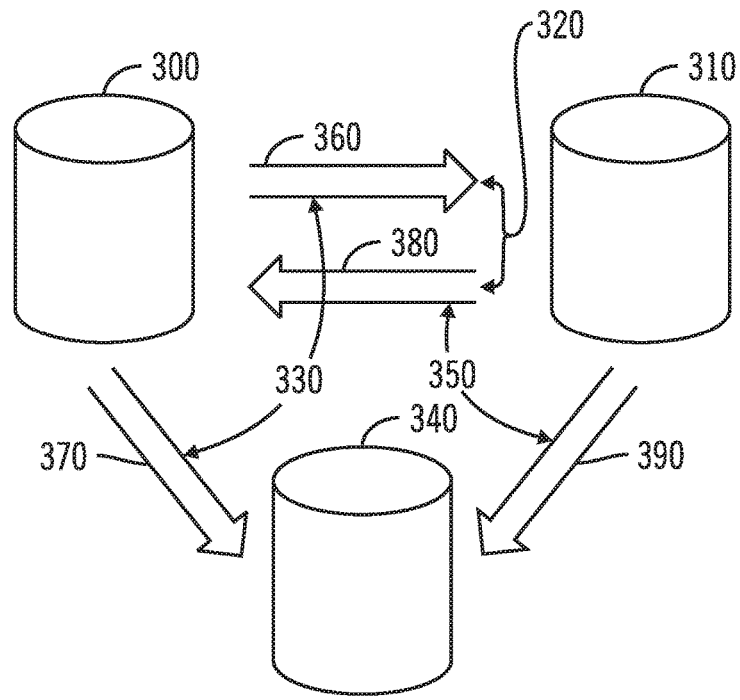
FIG. 3 illustrates an embodiment of multi-target mirroring to a tertiary storage unit for a pair of storage units in bidirectional data copying in a distributed computing system in accordance with one embodiment of the present description.

FIG. 3 shows one example of a tertiary mirroring arrangement which can, in accordance with one aspect of the present description, avoid a cascade arrangement and may reduce or eliminate performance degradation which may be associated with such cascade arrangements. The mirroring arrangement of FIG. 3 includes a pair of storage units 300, 310 which may be storage volumes, for example. The storage volumes 300, 310 are, in a manner similar to that of the storage volumes 200, 210 of FIG. 2, in bidirectional synchronous mirror relationships as represented by the bidirectional mirroring operations indicated by bidirectional arrow 320. In this embodiment, volumes 300, 310 are in an active/active bidirectional mirroring relationship in which both volume 300 and volume 310 are enabled for both read operations and write operations. Updates to volume 300 are synchronously mirrored to volume 310 and updates to volume 310 are synchronously mirrored to volume 300. A third volume 340 may be located such that it may avoid a disaster that could befall volumes 300 and 310.

However, in accordance with the present description, for updates written to the first storage unit 300 such that the first storage unit 300 has updates prior to the second storage unit 310, multi-target mirroring 330 is employed to write those updates written to the first storage unit 300 instead of to the second storage unit 310, to both the second storage unit 310 and to the third storage unit 340. Similarly, for updates written to the second storage unit 310 instead of to the first storage unit 300 such that the second storage unit 310 has updates prior to the first storage unit 300, multi-target mirroring 350 is again employed to write those updates written to the second storage unit 310 (instead of to the first storage unit 300), to both the first storage unit 300 and to the third storage unit 340. In one embodiment, the tertiary volume 340 may be located remotely from volumes 300, 310 to reduce the likelihood of a disaster which may affect volumes 300 and 310 also affecting volume 340.

As indicated in FIG. 3, the multi-target mirroring operations 330 include a mirroring operation 360 mirroring updates from the first storage unit 300 operating as a source, to a first target, that is, the second storage unit 310, and a mirroring operation 370 mirroring updates from the source storage unit 300 to a second target, that is, the tertiary storage unit 340. Similarly, the multi-target mirroring operations 350 include a mirroring operation 380 mirroring updates from the second storage unit 310 operating as a source, to a first target, that is, the first storage unit 300, and a mirroring operation 390 mirroring updates from the source storage unit 310 to a second target, that is, the tertiary storage unit 340. Thus, the bidirectional mirroring operation 320 includes two components, in this example, the mirroring operation 360 of the multi-target mirroring operation 330, and the mirroring operation 380 of the multi-target mirroring operation 350.

In the example of FIG. 3, the mirroring operations are synchronous mirroring operations. However, it is appreciated that in some embodiments, other types of mirroring operations may be employed such as asynchronous, for example.

In addition, it is noted that the storage unit 340 has, in effect, two sources, the storage unit 300 and the storage unit 310. Accordingly, the storage unit 340, the tertiary storage unit, is the target of write updates from both storage unit 300 and storage unit 310. In this manner, notwithstanding that storage units 300 and 310 are in a bidirectional relationship, storage unit 340 is kept up to date with all writes and may be maintained as data consistent with storage unit 300 and storage unit 310 without cascading write operations through either storage unit 300 or storage unit 310.

Although the embodiment of FIG. 1 is described in connection with a mirror relationship, it is believed that aspects of the present description are applicable to other types of copy relationships, depending upon the particular application. Additional features are discussed in the present description. It is appreciated that still other features may be realized instead of or in addition to those discussed herein, depending upon the particular application.

In the illustrated embodiment, a copy relationship identifies a source storage location, such as a primary storage location, and a target storage location, such as a secondary storage location, in which data stored at the source storage location is to be mirrored or otherwise copied to the target storage location. Thus, as used herein, a source storage location and a target storage location are storage locations related by a copy relationship.

Furthermore, as used herein, the term "storage unit" refers to a storage location containing one or more units of data storage such as one or more volumes, cylinders, tracks, segments, extents, or any portion thereof, or other unit or units of data suitable for transfer. Thus, a source storage unit and the associated target storage unit may each be a storage volume, wherein the volumes are typically at different devices or sites. However, it is appreciated that a source storage unit and a target storage unit may each be of a size other than a volume, for example.

In the illustrated embodiment, a network 102 (FIG. 1) includes storage control units or storage controllers 104a, 104b, 104c and associated data storages 106a, 106b, 106c, respectively. The storage control unit 104a and its associated data storage 106a provide a storage subsystem 108a. Similarly, the storage control unit 104b and its associated data storage 106b provide a storage subsystem 108b, and the storage control unit 104c and its associated data storage 106c provide a storage subsystem 108c. The storage control units 104a, 104b, 104c manage the copying of updates among a primary storage system, a secondary storage system, and a tertiary storage system. In the configuration illustrated in FIG. 1, the storage control unit 104a and the data storage 106a have been configured as a primary storage control unit and the primary storage, respectively. Similarly, the storage control unit 104b and its data storage 106b have been configured as a secondary storage control unit and a secondary storage, respectively, and the storage control unit 104c and its data storage 106c have been configured as a tertiary storage control unit and a tertiary storage, respectively. Hence, in the configuration depicted in FIG. 1, the storage control unit 104a will be referred to as a primary storage control unit 104a, and the data storage 106a will be referred to as a primary storage 106a. Similarly, the storage control unit 104b will be referred to as a secondary storage control unit 104b and the data storage 106b will be referred to as a secondary data storage 106b.

In a particular copy relationship, the source unit is often referred to as the primary and the target unit is often referred to as the secondary. As explained in greater detail below, bidirectional mirroring relationships are defined between storage units of the storage control unit 104a and 104b. Notwithstanding a reference to the data storage 106a as "primary" and the data storage 106b as "secondary," particular storage units of the data storage 106a and the storage 106b may play both a primary (or source role) and a target (or secondary role) depending upon the particular copy relationship.

The network 102 further includes one or more hosts 114 writing updates to the primary storage 106a. At least one such host 114, such as the host 114a, has in this embodiment, storage management functions including a monitor program 116 to monitor failures in the availability of the primary storage control unit 104a. In some embodiments, the monitor program 116 may be operated in a device apart from the hosts. The components 104a, 104b, 104c, 106a, 106b, 106c and 114 are connected to the network 102 and the network 102 enables communication among these components. The network 102 may include one or more switches to provide one or more paths of communication between the different network 102 elements.

The primary storage control unit 104a is located at a first site and the secondary storage control unit 104b is located at a second site which may be geographically or functionally remote from the first site. Similarly, the tertiary storage control unit 104c is located at a third site which may be geographically or functionally remote from either or both of the first and second sites. Thus, in this example, the first site may be at a local site and the second and tertiary sites may be at geographically remote sites separated by a short or long geographical distance from the local site and from each other. Alternatively, the local and remote sites may be relatively close such as in different buildings in the same general geographical location, in different rooms of the same building, in different machines in the same room, or in different portions or partitions of the same machine, of the network 102.

A typical host 114 includes an operating system 118 and an application 120 that reads data from and writes updates to the primary 106a or secondary 106b storage. The host 114a which includes the monitor program 116 may omit the update writing applications 120 in some embodiments. The primary 104a, secondary 104b and tertiary 104c storage control units include storage management software 122a, 122b, 122c to manage the data mirroring operations.

A first copy relationship 130a, which may be maintained for the primary 104a and secondary 104b storage control units, associates primary storage locations in the primary storage 106a and corresponding secondary storage locations in the secondary storage 106b, such that updates to the primary storage 106a locations are copied to the corresponding secondary storage 106b locations. For example, source storage locations in the storage volume 300 (FIG. 3) of storage 106a may be mirrored in the mirror operation 360 to target storage locations of the volume 310 of the storage 106b pursuant to the mirror copy relationship 130a. In some embodiments, the updates to the primary storage 106a locations may be copied to the corresponding secondary storage 106b locations before they are written to the primary storage 106a.

In the illustrated embodiment, the first copy relationship 130a comprises a peer-to-peer mirror relationship for a pair of storage locations in which updates to the primary (source) storage locations of the mirror relationship 130a are mirrored to the secondary (target) storage locations of the mirror relationship 130a. It is appreciated that other types of copy relationships may be established, depending upon the particular application.

In connection with the copy relationship 130a, updates to the primary storage locations of the primary storage 106a are indicated in a bitmap, which is an out-of-sync (OOS) bitmap in the illustrated embodiment. The OOS bitmap is cleared as the storage management code 122a, 122b copies updates indicated in the OOS bitmap to the corresponding storage locations of the secondary storage 106b of secondary storage control unit 104b.

The storage management software 122a accesses updates to the primary storage 106a to write to the corresponding storage locations in the storage 106b. In some applications, the copying and relationship functions may be performed by devices external to the storage systems 104a, 104b, such as the hosts 114, for example. In the illustrated embodiment, the copying relationship 130a is a mirroring process in which each write update to the primary storage 106a is mirrored over to the secondary storage 106b, and the I/O operation which performed the write operation to the primary storage 106a is not considered complete until the mirror operation is completed. Should the mirror operation fail such that the update was not successfully mirrored to the storage 106b, the write operation to the primary storage 106a is undone to maintain the full duplex status of the primary and secondary storage 106a, 106b. However, in some cases, the updates that did not complete being mirrored to the storage 106b can be recovered and applied to the storage 106b such that those updates to the storage 106a may be retained.

A second copy relationship 130b, which may be maintained for the secondary 104b and primary 104a storage control units, associates storage locations in the secondary storage 106b and corresponding storage locations in the primary storage 106a, such that updates to the secondary storage 106b locations are copied to the corresponding primary storage 106a locations. For example, source storage locations in the storage volume 310 (FIG. 3) of storage 106b may be mirrored in the mirror operation 380 to target storage locations of the volume 300 of the storage 106a pursuant to the mirror copy relationship 130b. In some embodiments, the updates to the secondary storage 106b locations may be copied to the corresponding primary storage 106a locations before they are written to the secondary storage 106b.

In the illustrated embodiment, the second copy relationship 130b, like first copy relationship 130a, comprises a peer-to-peer mirror relationship for a pair of storage locations in which updates to the source storage locations of the mirror relationship 130b are mirrored to the target storage locations of the mirror relationship 130b. It is appreciated that other types of copy relationships may be established, depending upon the particular application.

In connection with the copy relationship 130b, updates to the source storage locations of the secondary storage 106b are indicated in a bitmap, which is an out-of-sync (OOS) bitmap in the illustrated embodiment. The OOS bitmap is cleared as the storage management code 122b copies updates indicated in the OOS bitmap to the corresponding storage locations of the primary storage 106a of primary storage control unit 104a.

The storage management software 122b accesses updates to the secondary 106b to write to the corresponding storage locations in the storage 106a. In some applications, the copying and relationship functions may be performed by devices external to the storage systems 104a, 104b, such as the hosts 114, for example. In the illustrated embodiment, the copying relationship 130b is a mirroring process in which each write update to the secondary storage 106b is mirrored over to the primary storage 106a, and the I/O operation which performed the write operation to the secondary storage 106b is not considered complete until the mirror operation is completed. Should the mirror operation fail such that the update was not successfully mirrored to the storage 106a, the write operation to the primary storage 106b is undone to maintain the full duplex status of the primary and secondary storage 106a, 106b. However, in some cases, the updates that did not complete being mirrored to the storage 106a can be recovered and applied to the storage 106a such that those updates to the storage 106b may be retained.

In one aspect of the present description, the storage control unit 104a has another copy relationship, mirror copy relationship 136a in which each write update to the storage 106a is mirrored over not only to the secondary storage 106b (pursuant to the copy relationship 130a) but also to the tertiary storage 106c pursuant to the copy relationship 136a. For example, updates to source storage locations in the storage volume 300 (FIG. 3) of storage 106a may be mirrored in the mirror operation 360 to target storage locations of the volume 310 of the storage 106b pursuant to the mirror copy relationship 130a, but also mirrored in the mirror operation 370 to target locations in the volume 340 of the storage 106c.

Similarly, the storage control unit 104b has another copy relationship, mirror copy relationship 136b in which each write update to the storage 106a is mirrored over not only to the secondary storage 106b (pursuant to the copy relationship 130b) but also to the tertiary storage 106c pursuant to the copy relationship 136b. For example, updates to source storage locations in the storage volume 310 (FIG. 3) of storage 106b may be mirrored in the mirror operation 380 to target storage locations of the volume 300 of the storage 106a pursuant to the mirror copy relationship 130b, but also mirrored in the mirror operation 390 to target locations in the volume 340 of the storage 106c. Here too, the I/O operation which performed the initial write operation to either the primary storage 106a or to the secondary storage 106b, is not considered complete until the associated mirror operation 136a, 136b to the tertiary storage 106c is completed.

The monitor program 116 may monitor the primary storage control unit 104a and upon detecting a failure event, may utilize a multi-storage volume swap manager 140a of the storage management provided by an operating system 118 of a host 114, to cause a failover operation to cause updates from the host 114 to be sent to the secondary storage control unit 104b instead of to the primary storage control unit 104a. In one embodiment, such volume swapping may be achieved by modifying appropriate data structures such as storage Unit Control Blocks (UCBs) 150a (FIG. 1) of the multi-storage volume swap manager 140a. In the illustrated embodiment, the UCB's identify the storage locations in the primary and secondary storage subsystems, the status of such storage subsystem locations, and the network path to the particular storage locations of the storage subsystems. If the system fails while updates to the primary storage 106a are being applied to the storage 106b, then the updates that did not complete being mirrored to the storage 106b can be recovered and applied to the storage 106b.

In the illustrated embodiment, the multi-storage volume swap manager 140a provides a multi-storage volume swap function such as the IBM HyperSwap® function. As explained in greater detail below, a multi-storage volume swap function such as the IBM HyperSwap® may be modified in accordance with the present description to facilitate a resynchronization operation. Although the multi-storage volume swap manager 140a is a part of the operating system 118 of one or more hosts 114 in the illustrated embodiment, it is appreciated that a multi-storage volume swap manager may be implemented in application software of a host, or in the operating system or application software of a storage control unit, for example, for storage management functions.

The storage management code 122a, 122b, 122c is invoked to establish copy relationships such as the copy relationships 130a, 130b, 136a, 136b. The storage systems 104a, 104b may comprise enterprise storage servers, such as the IBM Enterprise Storage Server (ESS), for example.

The storage management code 122a, 122b, 122c managing the copy relationships may be implemented using synchronous copy operations, such as a peer-to-peer remote copy (PPRC) program. An example of a PPRC program is the IBM Tivoli Productivity Center for Replication copy program that enables the switching of updates to the primary storage 106a to the secondary storage 106b. The storage management code 122a, 122b, 122c may also implement asynchronous remote copy operations, where updates to the primary 106a or secondary 106b storage are mirrored to a corresponding location in at a remote site. Suitable asynchronous mirroring programs include XRC (or zGM). The described operations may be implemented with other programs such as other copy programs or other global recovery programs.

The network 102 includes a fabric which may comprise a Storage Area Network (SAN), Local Area Network (LAN), Intranet, the Internet, Wide Area Network (WAN), peer-to-peer network, wireless network, arbitrated loop network, etc. The storages 106a, 106b, 106c may comprise an array of storage devices, such as a Just a Bunch of Disks (JBOD), Direct Access Storage Device (DASD), Redundant Array of Independent Disks (RAID) array, virtualization device, tape storage, flash memory, etc.

Communication paths from the storage subsystems to the hosts 114 may be based upon a particular host attachment protocol such as FICON, for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

In the illustrated embodiment, communication hardware associated with the communication paths between the nodes includes switches, routers, cables, modems, adapters, power supplies, etc. Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
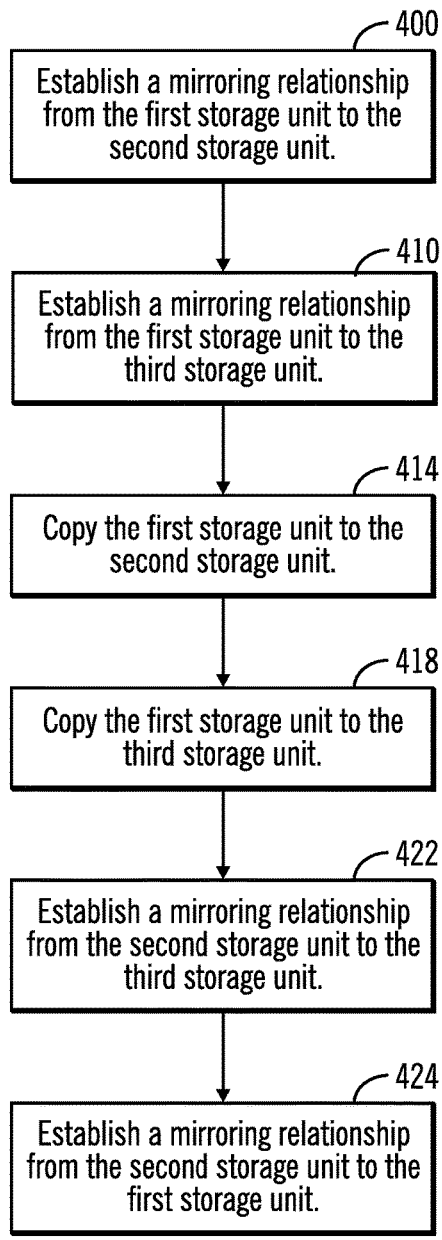
FIG. 4 illustrates an embodiment of operations for establishing mirroring relationships for multi-target mirroring to a tertiary storage unit for a pair of storage units in bidirectional data copying in a distributed computing system in accordance with one embodiment of the present description.

FIG. 4 illustrates one example of operations for managing a tertiary storage unit in bidirectional data copying in a distributed computing system. In this example, multi-target mirroring is established with bidirectional mirroring. In one operation, a mirroring relationship such as the mirroring relationship 130a (FIG. 1) from a first storage unit such as the storage volume 300 to a second storage unit such as the storage volume 310, may be established (block 400). In one embodiment, the mirroring relationship 130a is a synchronous mirroring relationship with full background copy from volume 300 to volume 310. It is appreciated that in other embodiments, other copying relationships may be established such as asynchronous copying and nonbackground copying, for example.

Another mirroring relationship such as the mirroring relationship 136a (FIG. 1, 3) from the first storage unit such as the storage volume 300 to the tertiary storage unit such as the storage volume 340, may also be established (block 410). Here too, in one embodiment, the mirroring relationship 136a is a synchronous mirroring relationship with full background copy from volume 300 to volume 340.

The data on the first storage unit, volume 300, may be copied (block 414) to the second storage unit, volume 310. In addition, the data on the first storage unit, volume 300, may also be copied (block 418) to the tertiary storage unit, volume 340. Once the mirroring relationships 130a, 136a have reached full duplex status, another mirroring relationship such as the mirroring relationship 136b (FIG. 1, 3) from the second storage unit such as the storage volume 310 to the tertiary storage unit such as the storage volume 340, may also be established (block 422). Here too, in one embodiment, the mirroring relationship 136a is a synchronous mirroring relationship. However, the mirroring relationship 136b may be established with no background copy from volume 310 to volume 340 since the mirroring relationships 130a and 136a had already reached full duplex status among volumes 300, 310 and 340.

The bidirectional mirroring relationship may be established by establishing (block 424) a mirroring relationship 130b (FIG. 1, 3) from second storage unit such as the storage volume 310 to the first storage unit such as the storage volume 300. In one embodiment, the mirroring relationship 130b is a synchronous mirroring relationship. However, the mirroring relationship 130b may be established with no background copy from volume 310 to volume 300 since the mirroring relationship 130a had already reached full duplex status between volumes 300 and 310. It is appreciated that in other embodiments, other copying relationships may be established such as asynchronous copying and nonbackground copying relationships, for example.

Figure 5:
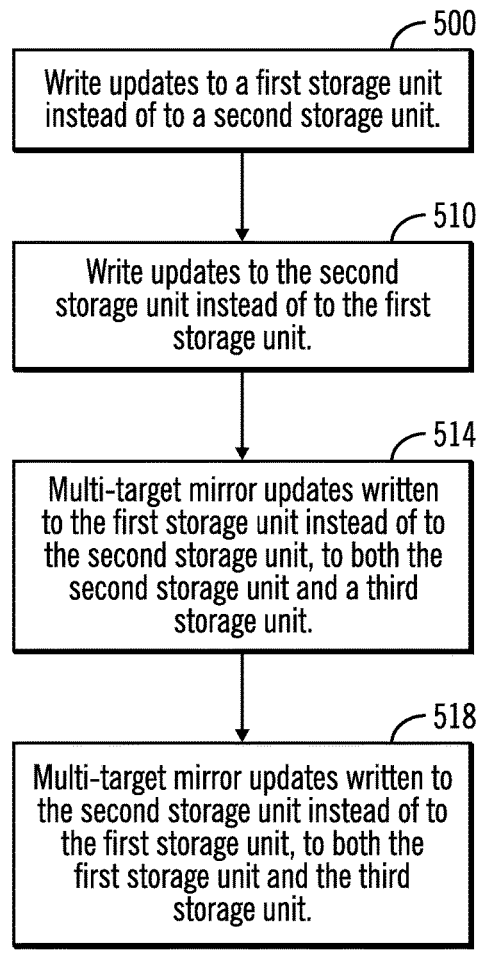
FIG. 5 illustrates an embodiment of operations for mirroring updates with multi-target mirroring to a tertiary storage unit for a pair of storage units in bidirectional data copying in a distributed computing system in accordance with one embodiment of the present description.

FIG. 5 illustrates another example of operations for managing a tertiary storage unit in bidirectional data copying in a distributed computing system. In this example, bidirectional mirroring has been established between two volumes as described in connection with FIG. 4, for example. In addition, multi-target mirroring has been established between each of the two volumes of the bidirectional mirroring and a tertiary volume. In one operation, updates are written (block 500) to a first storage unit such as the storage volume 300 (FIG. 3) instead of to a second storage unit such as the storage volume 310) so that the first storage unit has updates prior to the second storage unit. Similarly, updates are written (block 510) to the second storage unit (such as storage volume 310) instead of to the first storage unit (such as storage volume 300, for example) so that the second storage unit has updates prior to the first storage unit. In accordance with the present description, updates written to the first storage unit instead of to the second storage unit (block 500) are multi-target mirrored (block 514) to both the second storage unit and a third storage unit (such as the storage volume 340, for example). Similarly, updates written to the second storage unit instead of to the first storage unit, are multi-target mirrored (block 518) to both the first storage unit and the third storage unit. Thus, FIG. 5 provides one example of a tertiary mirroring arrangement which can, in accordance with one aspect of the present description, avoid a cascade arrangement and may reduce or eliminate performance degradation which may be associated with such cascade arrangements.

Figure 6:
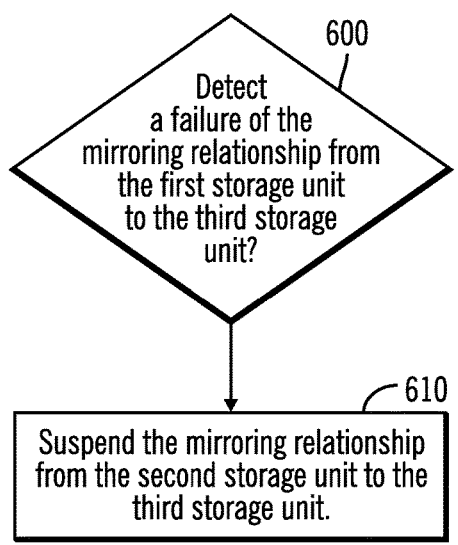
FIG. 6 illustrates an embodiment of operations for suspending multi-target mirroring to a tertiary storage unit in the event of a failure in multi-target mirroring.

FIG. 6 is directed to another example of operations for managing a tertiary storage unit in bidirectional data copying in a distributed computing system in accordance with an aspect of the present description. FIG. 6 is directed to the possibility that one of the multi-target mirroring operations 330, 350 (FIG. 3) between one of the storage volumes 300, 310 of the bidirectional mirroring operation 320, and the tertiary storage volume 340, should break or otherwise cease to operate properly.

Thus, in a first operation, a failure of the mirroring relationship such as the mirroring relationship 136a (FIG. 1) associated with the mirroring operation 370 (FIG. 3), for example, from a first storage unit such as the storage volume 300 to a third storage unit such as the storage volume 340, is detected (block 600). In response to the detection, the mirroring relationship such as the mirroring relationship 136b (FIG. 1) associated with the mirroring operation 390 (FIG. 3) from the second storage unit such as the storage volume 310 to the third storage unit such as storage volume 340, is suspended (block 610, FIG. 6).

For example, in one embodiment, in the event that the mirroring operation 370 between the first storage unit such as storage volume 300, for example, and the tertiary storage unit, such as storage volume 340, should break (block 600), the affected write I/O operation to the tertiary storage volume 340 will be held. In addition, an interrupt may be raised to controlling software such as the manager 140a or application 120, to facilitate the suspension (block 610) of the remaining mirror operation 390 to the tertiary storage volume 340, to keep the data of the tertiary storage volume 340 consistent with both storage volumes, 300, 310, to that point in time. It is appreciated that if only the mirror operation 390 of the mirror operations 370 and 390 was actually operational, the write operations directed first to the second storage volume 310 would be successfully mirrored to the tertiary storage volume 340 but the write operations directed first to the first storage volume 300 would not be successfully mirrored to the tertiary storage volume 340. As a result, the tertiary storage volume 340 would lose consistency with storage volumes 300 and 310 at the point in time in which one of the multi-target mirroring operations 370, 390 (FIG. 3) between one of the storage volumes 300, 310 of the bidirectional mirroring operation 320, and the tertiary storage volume 340, ceased to operate properly. However, because point-in-time consistency has been maintained at the point of the failure of the multi-target mirroring operation, the tertiary volume may be subsequently resynchronized to the storage volumes 300, 310 of the bidirectional mirroring operation 320 in a resynchronization operation discussed below in connection with FIG. 9.

Figure 7:
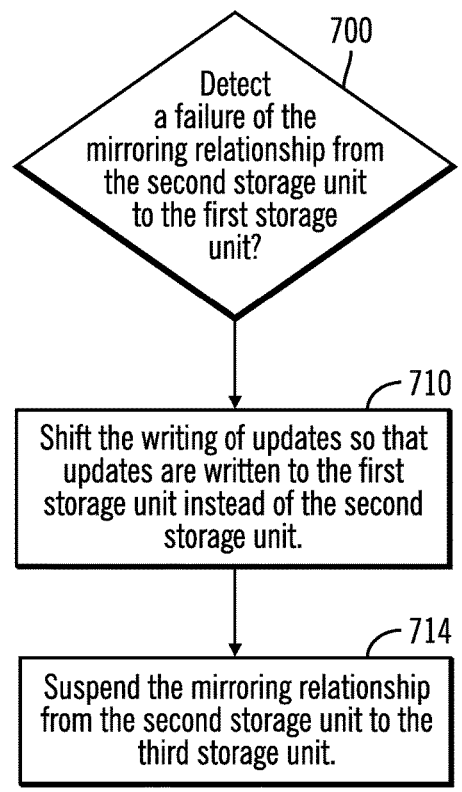
FIG. 7 illustrates an embodiment of operations for suspending multi-target mirroring to a tertiary storage unit in the event of a failure in bidirectional mirroring.

FIG. 7 is another example of operations for managing a tertiary storage unit in bidirectional data copying in a distributed computing system in accordance with another aspect of the present description. FIG. 7 is directed to the possibility that one of the bidirectional mirroring operations 360, 380 (FIG. 3) between the storage volumes 300, 310 of the bidirectional mirroring operation 320, should break or otherwise cease to operate properly.

Thus, in a first operation, a failure of the mirroring relationship such as the mirroring relationship 130b (FIG. 1) associated with the mirroring operation 380 (FIG. 3), for example, from a second storage unit such as the storage volume 310 to the first storage unit such as the storage volume 300, is detected (block 700). In response to the detection, the writing of updates is shifted (block 710) so that updates are written to the first storage unit (such as storage volume 300) instead of the second storage unit (such as storage volume 310) so that the second storage unit no longer receives updates prior to the first storage unit.

In this example, the mirroring operation 370 continues such that all write operations to the first storage unit such as storage volume 300, including the write operations shifted from the second storage unit to the first storage unit, are mirrored to the tertiary storage unit such as storage volume 340. However, the mirroring relationship such as the mirroring relationship 390, for example, from the second storage unit (such as storage volume 310) to the third storage unit (such as storage volume 340), is suspended (block 714, FIG. 7), since the second storage unit is no longer receiving (block 710) updates prior to the first storage unit. In this manner, the tertiary volume 340 remains consistent with the first storage volume 300, notwithstanding the suspension of the mirroring relationship 136b and its associated mirroring operation 390. In one embodiment, updates to the first storage unit may continue to be mirrored to the second storage unit in keeping with the mirror operation 360. Thus, the secondary storage unit may be maintained as data consistent with the tertiary volume 340 and the first storage volume 300, notwithstanding the suspension of the mirroring relationship 136b and its associated mirroring operation 390.

Figure 8:
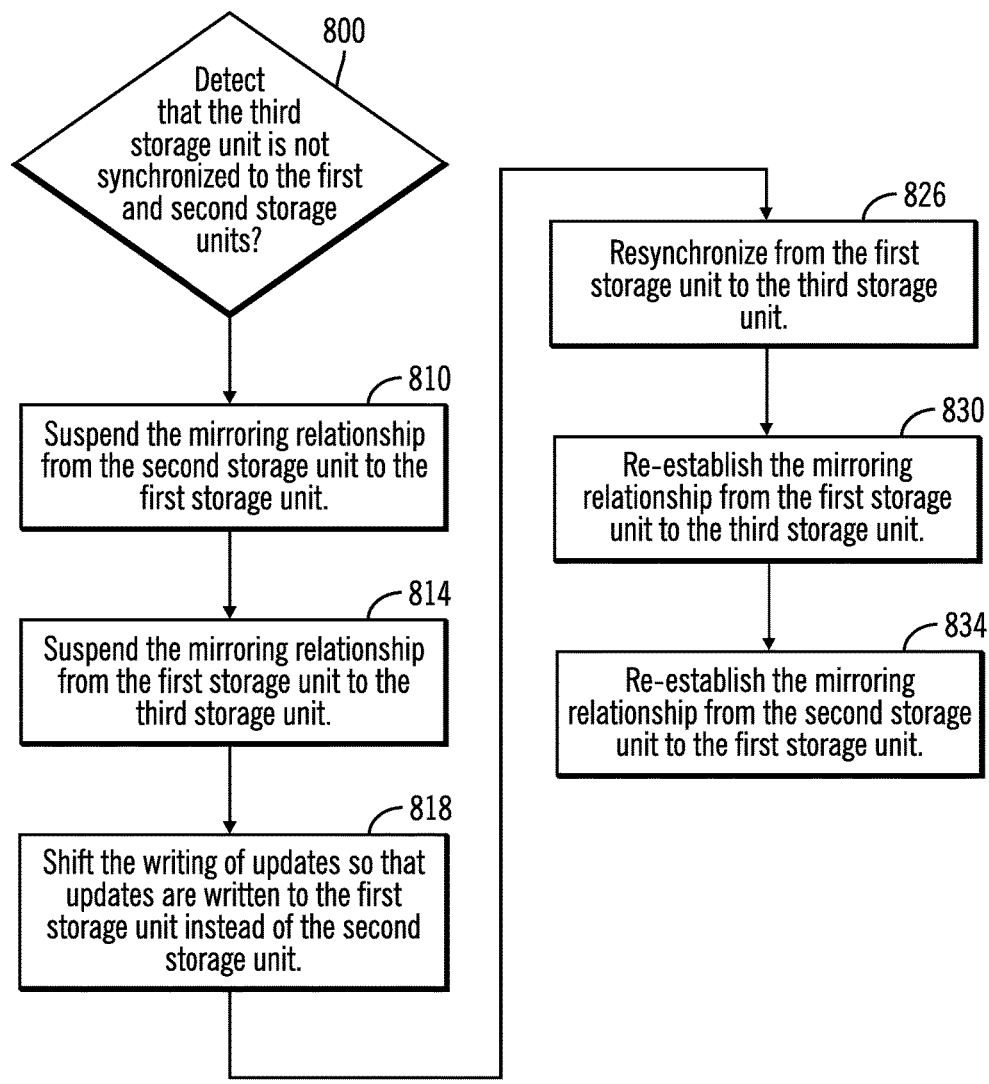
FIG. 8 illustrates an embodiment of operations for resynchronizing a tertiary storage unit to storage units in a bidirectional data copying relationship.

FIG. 8 is yet another example of operations for managing a tertiary storage unit in bidirectional data copying in a distributed computing system in accordance with another aspect of the present description. FIG. 8 is directed to resynchronizing a tertiary volume to the first and second volumes of a bidirectional mirroring operation should the tertiary volume no longer be synchronized to the first and second volumes due to various factors. For example, FIG. 6 discussed above describes a situation in which the tertiary storage volume 340 is no longer synchronized with storage volumes 300 and 310 after the point in time in which one of the multi-target mirroring operations 370, 390 (FIG. 3) between one of the storage volumes 300, 310 of the bidirectional mirroring operation 320, and the tertiary storage volume 340, ceased to operate properly. However, because point-in-time consistency has been maintained at the point of the failure of the multi-target mirroring operation, by suspending both multi-target mirroring operations 370, 390 at the point one of the multi-target mirroring operations 370, 390 failed, the tertiary volume may be subsequently resynchronized to the storage volumes 300, 310 of the bidirectional mirroring operation 320 in a resynchronization operation discussed below.

In the illustrated embodiment, the tertiary volume is re-synchronized from both source volumes, that is the first and second storage volumes of the bidirectional mirror relationship. In one aspect of the present description, resynchronization need not be data consistent meaning that resynchronization updates to the tertiary volume need not be written in the same order as they were written to either the first storage volume or the second storage volume of the bidirectional mirror relationship. As a result, the order of updates to the same track of the tertiary volume need not be monitored or otherwise determined.

As explained below, to re-synchronize the tertiary volume, the bidirectional mirror operation is first stopped and all I/O shifted to either volume of the bidirectional mirror relationship. After the shift, re-synchronization of the tertiary volume may proceed. As explained below, the resynchronization is done in an order and in relationship states which obviate resynchronization updates to the tertiary volume being written in the same order as they were written to either the first storage volume or the second storage volume of the bidirectional mirror relationship.

Accordingly, in a first operation, the tertiary storage unit is detected (block 800) as being no longer synchronized to the first and second storage units of the bidirectional mirroring relationship. Thus, in the example of FIG. 3, it may be detected that the tertiary storage volume 340 is no longer data consistent with the storage volumes 300 and 310 being updated in the bidirectional mirroring operation 320. The loss of synchronization or data consistent state may occur due to various factors such as a hardware, software or communication error.

In response to the detection, one of the mirroring relationships of the bidirectional mirroring operation is suspended (block 810). In the example of FIG. 8, the mirroring operation from the second storage unit to the first storage unit is suspended (block 810). Thus, in the example of FIG. 3, the mirroring relationship 130b associated with the mirroring operation 380 from the second storage volume 310 to the first storage volume 300 is suspended (block 810). In addition, the mirroring relationship from the first storage unit to the third storage unit is suspended (block 814). In the example of FIG. 3, the mirroring relationship 136a associated with the mirroring operation 370 from the first storage volume 300 to the third storage volume 340 is suspended (block 814).

At this point, the writing of updates may be shifted (block 818) so that updates are written to the first storage unit instead of the second storage unit so that the second storage unit no longer has updates prior to the first storage unit. In the example of FIG. 3, the writing of updates may be shifted (block 818) so that updates are written to the first storage volume 300 instead of the second storage volume 310 so that the second storage volume no longer has updates prior to the first storage volume 300. It is appreciated that in other embodiments, the writing of updates may be shifted so that updates are written to the second storage unit instead of the first storage unit so that the first storage unit no longer has updates prior to the second storage unit. Thus, in the example of FIG. 3, the writing of updates may be shifted so that updates are written to the second storage volume 310 instead of the first storage volume 300 so that the first storage volume 300 no longer has updates prior to the second storage volume 310.

In the example of FIG. 8, following shifting (block 818) of the writing of updates so that updates are written to the first storage unit instead of the second storage unit the first storage unit may be resynchronized (block 826) to the third storage unit so that the data of the tertiary storage volume is consistent with that of the first storage volume 300, using appropriate bit maps which identify the particular tracks of the tertiary storage volume 340 which are out of sync with the corresponding tracks of the first storage volume 300. Tracks which are out of synch may be resynchronized with a copy operation copying data from the source track to the out of sync track of the target. It is appreciated that in embodiments in which the writing of updates is shifted from the first storage unit to the second storage unit, the second storage unit may be resynchronized to the tertiary storage unit prior to the first storage unit.

Thus, any updates that occurred to the same track on the first storage unit and the second storage unit of the bidirectional mirror relationship are now brought up to date on the tertiary storage unit from the first storage unit. Upon resynchronizing the first storage unit to the third storage unit (block 826) such that the first storage unit and the third storage unit are at duplex status, the mirroring relationship from the first storage unit to the third storage unit (such as mirror relationship 136a, for example) may be re-established (block 830) and the mirroring relationship from the second storage unit to the first storage unit (such as mirroring relationship 130b, for example) may be re-established (block 834).

Figure 9:
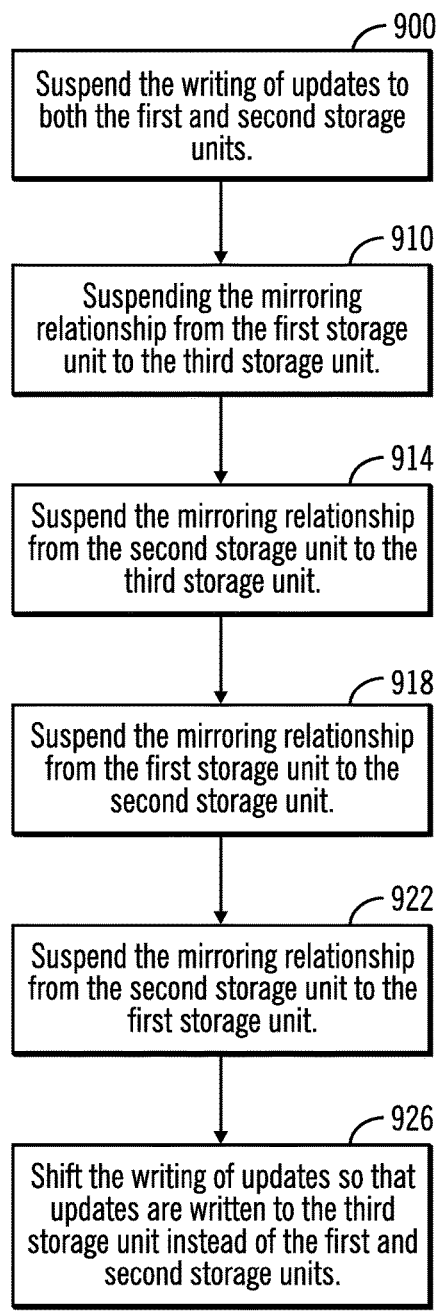
FIG. 9 illustrates an embodiment of operations for establishing a tertiary storage unit as a production storage unit, replacing a pair of storage units in bidirectional data copying.

FIG. 9 is another example of operations for managing a tertiary storage unit in bidirectional data copying in a distributed computing system in accordance with another aspect of the present description. FIG. 9 is directed to making the tertiary storage unit a production volume by suspending the mirror relations that have it as a target. In one embodiment, relationships are suspended within the same I/O suspension window which is initiated by suspending I/O operations to the storage units of the bidirectional mirror relationship and the tertiary storage unit. The I/O suspension window ends when the I/O operations are resumed.

Accordingly, in a first operation, the writing of updates to both the first and second storage units is suspended (block 900) to initiate the I/O suspension window. Within that same I/O suspension window, the mirroring relationship (such as, for example, the mirroring relationship 136a associated with the mirroring operation 370) from the first storage unit to the third storage unit may then be suspended (block 910) and the mirroring relationship (such as, for example, the mirroring relationship 136b associated with the mirroring operation 390) from the second storage unit to the third storage unit may also be suspended (block 914). Also, within that same I/O suspension window, the mirroring relationship (such as, for example, the mirroring relationship 130a associated with the mirroring operation 360) from the first storage unit to the second storage unit may be suspended (block 918) and the mirroring relationship (such as, for example, the mirroring relationship 136b associated with the mirroring operation 380) from the second storage unit to the first storage unit may be suspended (block 922). Once the mirror relationships including those which have the tertiary storage unit as a target are suspended, the I/O operations are resumed, terminating the I/O suspension window. However, the writing of updates is shifted (block 926) so that updates are written to the third storage unit instead of the first and second storage units. In this manner, the tertiary storage unit may be configured as a production volume. Updates written to the tertiary storage unit may be mirrored using multi-target mirroring to mirror updates written to the third storage unit to both the first storage unit and the second storage unit.

Figure 10:
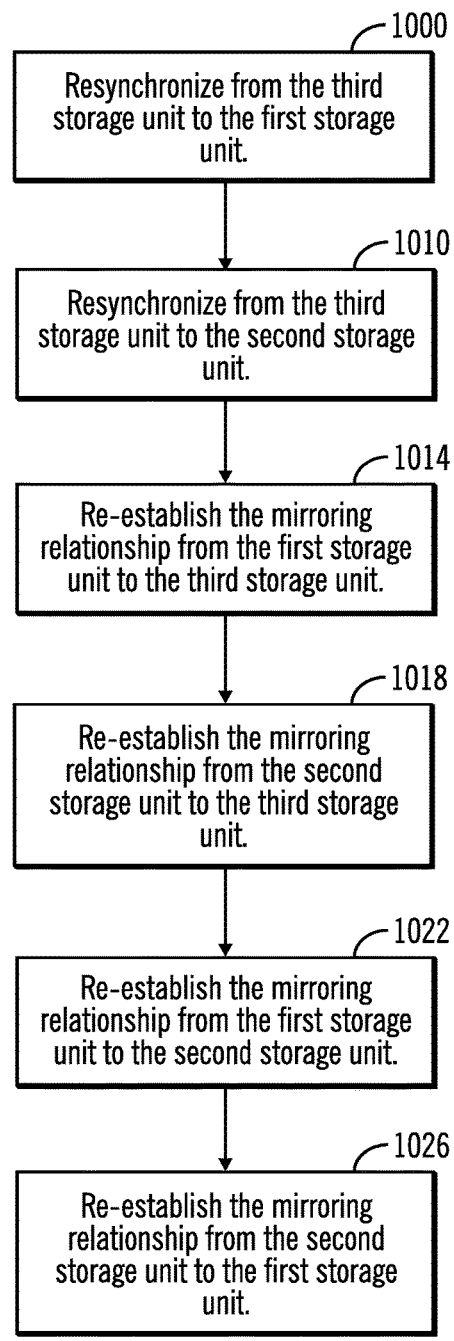
FIG. 10 illustrates an embodiment of operations for resynchronizing a pair of storage units in a bidirectional data copying relationship, using a tertiary storage unit as a source storage unit.

FIG. 10 is another example of operations for managing a tertiary storage unit in bidirectional data copying in a distributed computing system in accordance with another aspect of the present description. FIG. 10 is directed to resynchronizing from the tertiary storage unit back to the pair of storage units of the prior bidirectional mirror and then restarting the bidirectional mirror operation. In resynchronizing from the tertiary storage unit to the storage units of the bidirectional mirror pair, in one embodiment, the storage units of the bidirectional mirror pair and the tertiary storage unit will be at full duplex prior to restarting the bidirectional mirror operation.

Resynchronizing from the tertiary storage unit may be initiated by resynchronizing (block 1000) from the third storage unit to the first storage unit, and resynchronizing (block 1010) from the third storage unit to the second storage unit. In one embodiment, multi-target mirroring may be utilized to copy the updates made to the tertiary storage unit back to both storage units of the pair of storage units of the bidirectional mirror relationship, at the same time. As a result, achieving data consistency among all three storage units, the tertiary storage unit and the storage units of the bidirectional mirror pair, may be facilitated.

In another embodiment, the operations of FIG. 9 by which the tertiary storage unit became a production storage unit may be part of a failover operation of a Hyperswap operation which failed I/O operations over to the tertiary storage unit. Accordingly, a failback operation of a Hyperswap operation may be utilized to failback to a selected storage unit of the bidirectional mirror pair.

Resynchronization between the tertiary storage unit and the selected storage unit of the bidirectional mirror pair may be facilitating using an out of sync bitmap identifying the tracks of the selected storage unit out of sync with the tertiary storage unit. In some embodiments, the tertiary storage unit may be provided an out of sync bit map for both storage units of the bidirectional mirror pair. As a result, the bitmaps may be merged so that the tertiary storage unit may be resynchronized to both storage units of the bidirectional mirror pair at the same time utilizing multi-target mirroring. In another embodiment, the resynchronization operation may toggle between the respective out of sync bitmaps until the tertiary storage unit is resynchronized to both storage units of the prior bidirectional mirror pair.

Upon resynchronization of the tertiary storage unit to the storage units of the bidirectional mirror pair, the mirroring relationship (such as the mirroring relationship 136a, for example) from the first storage unit to the third storage unit may be reestablished (block 1014), and the mirroring relationship (such as the mirroring relationship 136b, for example) from the second storage unit to the third storage unit may be reestablished (block 1018). In addition, the mirroring relationship (such as the mirroring relationship 130a, for example) from the first storage unit to the second storage unit may be reestablished (block 1022), and the mirroring relationship (such as the mirroring relationship 130b, for example) from the second storage unit to the first storage unit may be reestablished (block 1026).

As previously mentioned, in one embodiment, multi-target mirroring may be utilized to copy the updates made to the tertiary storage unit back to both storage units of the pair of storage units of the bidirectional mirror relationship, at the same time. However, in some embodiments, the tertiary storage unit may be resynchronized to a selected storage unit of the bidirectional mirror pair and a failback operation of a Hyperswap operation may be performed to the selected storage unit to re-establish multi-target mirroring from the selected storage unit (such as storage volume 300, for example) to the tertiary storage unit. In addition, multi-target mirroring from the selected storage unit (such as storage volume 300, for example) to the other storage unit (such as the storage volume 310, for example) may be re-established to re-synchronize the selected storage unit to the other storage unit of the bidirectional mirror pair.

In some embodiments, I/O operations may be suspended prior to re-establishing the bidirectional mirror relationship and then resumed in the bidirectional mirror operation. In other embodiments, if the tertiary storage unit is connected to a host having Hyperswap software, a Hyperswap operation may be utilized to switch I/O operations from the tertiary storage unit to a selected storage unit of the bidirectional mirror pair to restart the bidirectional mirror operation. In this manner, a suspension of I/O operations may be avoided.

Figure 11:
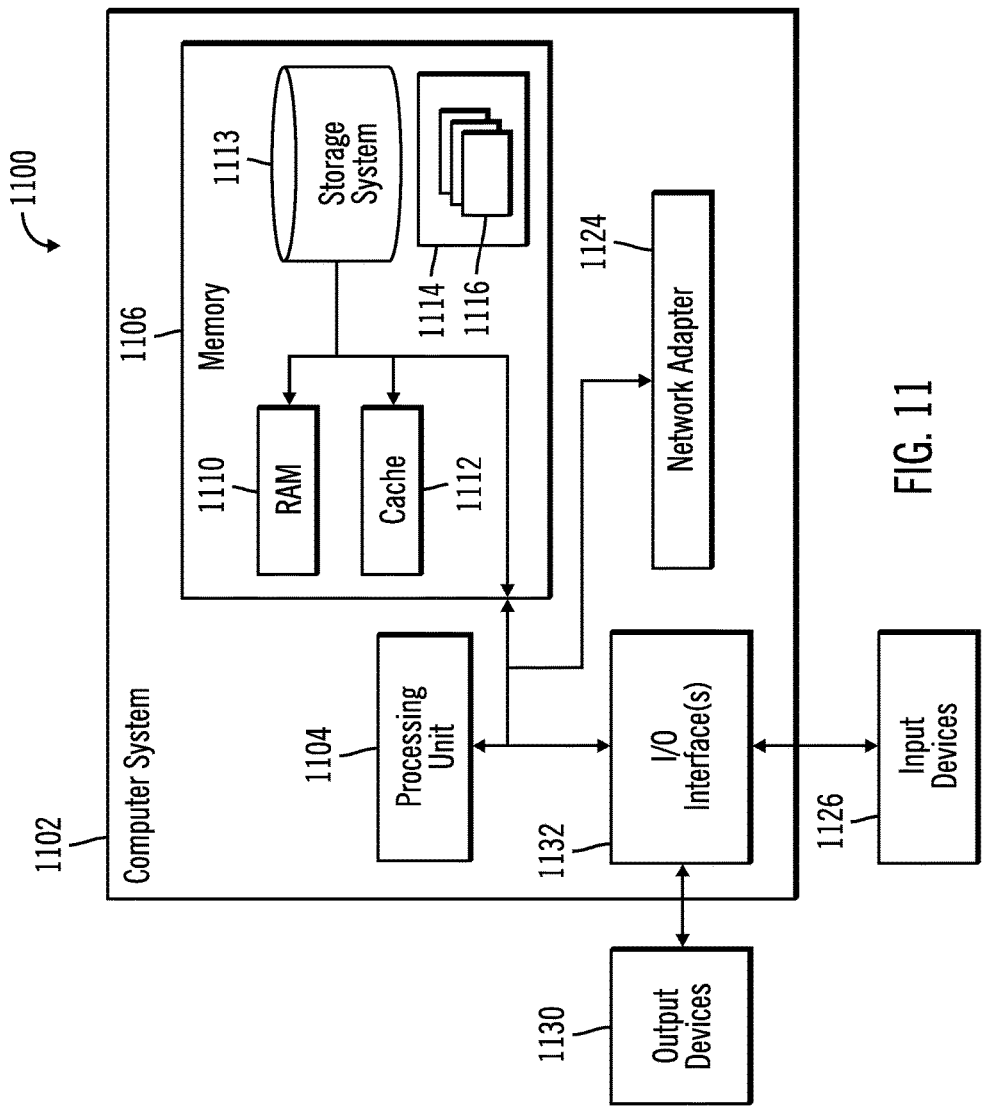
FIG. 11 illustrates one node of a network computing environment, employing tertiary storage unit management for bidirectional data copying in a distributed computing system in accordance with one embodiment of the present description.

FIG. 11 illustrates one embodiment of a node 1100 of a distributed computing system such a host, application server, storage controller, server or virtual server, of the storage area network 102 of FIG. 12. However, it is appreciated that the node 1100 of FIG. 11 may comprise any suitable computing device 1102, such as a mainframe, server, personal computer, laptop, handheld computer, telephony device, network appliance, virtualization device, storage controller, failover lock device, embedded device, etc.

It is appreciated that the nodes of a distributed computing system may perform a variety of data processing functions such as data storage and management in disk arrays, for example. Thus, the node of FIG. 11 may perform data processing tasks such as data backup, data deduplication, data mining data capture, data archiving, data replication, bandwidth reduced data replication, encryption of data, etc. and typically involve the transfer of large amounts of data between the hosts 114 and storage 106a, 106b, 106c (FIG. 1).

The node 1100 may perform tertiary storage unit management for bidirectional data copying in a distributed computing system in accordance with one embodiment of the present description.

The node may include a processor 1104 (e.g., a microprocessor), a memory 1106 (e.g., a volatile memory device 1110), cache 1112, and storage 1113 (e.g., a non-volatile storage, such as magnetic disk drives, optical disk drives, a tape drive, flash storage etc.).

A storage 1114 may comprise an internal storage device or an attached or network accessible storage. Programs 1116 in the storage 1114 are loaded into the memory 1110 and executed by the processor 1104 as represented by an operating system and data processing programs 1116.

Programs 1116 are also provided in the memory 1104 for data migration management in accordance with the present description.

The node further includes a network controller or adapter 1124 to enable communication with a network such as an Ethernet, a Fibre Channel Arbitrated Loop, etc. which interconnects the nodes of the distributed computing system. The network controller or adapter 1124 may also enable communication with a network path to a host 14 or communication with a network path to storage 6.

User input devices 1126 provide user input to the processor 1104, and may include a keyboard, mouse, pen-stylus, microphone, touch sensitive display screen, or any other suitable activation or input mechanism. Output devices 1130 are capable of rendering information transmitted from the processor 1104, or other component, such as a display monitor, printer, storage, etc. The input devices 1126, and output devices 1120 may be coupled directly to a node using a suitable KVM (keyboard, video, mouse) switch in some applications.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various embodiments has been presented for the purposes of illustration and description. It is not intended to be exhaustive or to limit to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
    writing updates to a first storage unit so that the first storage unit has updates prior to a second storage unit;
    writing updates to the second storage unit so that the second storage unit has updates prior to the first storage unit;
    first multi-target mirroring updates written to the first storage unit, to both the second storage unit and a third storage unit;

second multi-target mirroring updates written to the second storage unit, to both the first storage unit and the third storage unit;
detecting a failure of a mirroring relationship of the first multi-target mirroring, from the first storage unit to the third storage unit; and
in response to the detection, suspending an operational mirroring relationship of the second multi-target mirroring, from the second storage unit to the third storage unit.

2. The method of claim 1, wherein the first multi-target mirroring updates written to the first storage unit, to both the second storage unit and a third storage unit includes:
establishing a mirroring relationship from the first storage unit to the second storage unit;
establishing a mirroring relationship from the first storage unit to the third storage unit;
copying the first storage unit to the second storage unit; and
copying the first storage unit to the third storage unit; and
wherein the second multi-target mirroring updates written to the second storage unit, to both the first storage unit and the third storage unit includes:
establishing a mirroring relationship from the second storage unit to the third storage unit; and
establishing a mirroring relationship from the second storage unit to the first storage unit.

3. The method of claim 2, further comprising:
detecting a failure of the mirroring relationship from the second storage unit to the first storage unit;
in response to the detection, shifting the writing of updates so that updates are written to the first storage unit so that the second storage unit no longer has updates prior to the first storage unit, and
suspending the mirroring relationship from the second storage unit to the third storage unit.

4. The method of claim 2, further comprising:
detecting that the third storage unit is not synchronized to the first and second storage units; and
in response to the detection:
suspending mirroring relationship from the first storage unit to the third storage unit;
suspending mirroring relationship from the second storage unit to the first storage unit;
shifting the writing of updates so that updates are written to the first storage unit so that the second storage unit no longer has updates prior to the first storage unit,
resynchronizing from the first storage unit to the third storage unit;
re-establishing the mirroring relationship from the first storage unit to the third storage unit; and
re-establishing the mirroring relationship from the second storage unit to the first storage unit.

5. The method of claim 2, further comprising:
suspending the writing of updates to both the first and second storage units;
suspending the mirroring relationship from the first storage unit to the third storage unit;
suspending the mirroring relationship from the second storage unit to the third storage unit;
suspending the mirroring relationship from the first storage unit to the second storage unit;
suspending the mirroring relationship from the second storage unit to the first storage unit; and
shifting the writing of updates so that updates are written to the third storage unit.

6. The method of claim 5 further comprising multi-target mirroring updates written to the third storage unit, to both the first storage unit and the second storage unit.

7. The method of claim 5 further comprising:
resynchronizing from the third storage unit to the first storage unit;
resynchronizing from the third storage unit to the second storage unit;
re-establishing the mirroring relationship from the first storage unit to the third storage unit;
re-establishing the mirroring relationship from the second storage unit to the third storage unit;
re-establishing the mirroring relationship from the first storage unit to the second storage unit; and
re-establishing the mirroring relationship from the second storage unit to the first storage unit.

8. A system, comprising:
a plurality of hosts;
a plurality of storage units;
at least one storage controller adapted to access and control the storage units; and
at least one computer readable storage medium having computer readable program code embodied therein that is enabled to cause operations to be performed, the operations comprising:
writing updates to a first storage unit so that the first storage unit has updates prior to a second storage unit;
writing updates to the second storage unit so that the second storage unit has updates prior to the first storage unit;
first multi-target mirroring updates written to the first storage unit, to both the second storage unit and a third storage unit;
second multi-target mirroring updates written to the second storage unit, to both the first storage unit and the third storage unit;
detecting a failure of a mirroring relationship of the first multi-target mirroring, from the first storage unit to the third storage unit; and
in response to the detection, suspending an operational mirroring relationship of the second multi-target mirroring, from the second storage unit to the third storage unit.

9. The system of claim 8 wherein the first multi-target mirroring updates written to the first storage unit, to both the second storage unit and a third storage unit includes:
establishing a mirroring relationship from the first storage unit to the second storage unit;
establishing a mirroring relationship from the first storage unit to the third storage unit;
copying the first storage unit to the second storage unit; and
copying the first storage unit to the third storage unit; and
wherein the second multi-target mirroring updates written to the second storage unit, to both the first storage unit and the third storage unit includes:
establishing a mirroring relationship from the second storage unit to the third storage unit; and
establishing a mirroring relationship from the second storage unit to the first storage unit.

10. The system of claim 9, wherein the operations further comprise:
detecting a failure of the mirroring relationship from the second storage unit to the first storage unit;

in response to the detection, shifting the writing of updates so that updates are written to the first storage unit so that the second storage unit no longer has updates prior to the first storage unit, and
suspending the mirroring relationship from the second storage unit to the third storage unit.

11. The system of claim 9, wherein the operations further comprise:
   detecting that the third storage unit is not synchronized to the first and second storage units; and
   in response to the detection:
      suspending the mirroring relationship from the first storage unit to the third storage unit;
      suspending the mirroring relationship from the second storage unit to the first storage unit;
      shifting the writing of updates so that updates are written to the first storage unit so that the second storage unit no longer has updates prior to the first storage unit,
      resynchronizing from the first storage unit to the third storage unit;
      re-establishing the mirroring relationship from the first storage unit to the third storage unit; and
   re-establishing the mirroring relationship from the second storage unit to the first storage unit.

12. The system of claim 9, wherein the operations further comprise:
   suspending the writing of updates to both the first and second storage units;
   suspending the mirroring relationship from the first storage unit to the third storage unit;
   suspending the mirroring relationship from the second storage unit to the third storage unit;
   suspending the mirroring relationship from the first storage unit to the second storage unit;
   suspending the mirroring relationship from the second storage unit to the first storage unit; and
   shifting the writing of updates so that updates are written to the third storage unit.

13. The system of claim 12 wherein the operations further comprise:
   multi-target mirroring updates written to the third storage unit, to both the first storage unit and the second storage unit.

14. The system of claim 12 wherein the operations further comprise:
   resynchronizing from the third storage unit to the first storage unit;
   resynchronizing from the third storage unit to the second storage unit;
   re-establishing the mirroring relationship from the first storage unit to the third storage unit;
   re-establishing the mirroring relationship from the second storage unit to the third storage unit;
   re-establishing the mirroring relationship from the first storage unit to the second storage unit; and
   re-establishing the mirroring relationship from the second storage unit to the first storage unit.

15. A computer program product for managing data storage operations in connection with a plurality of hosts, and at least one storage subsystem including a plurality of original source storage units, a plurality of original target storage units, a plurality of replacement source storage units, and at least one storage controller adapted to access and control storage units of the at least one storage subsystems, the computer program product comprising at least one computer readable storage medium having computer readable program code embodied therein that is enabled to cause operations to be performed, the operations comprising:
   writing updates to a first storage unit so that the first storage unit has updates prior to a second storage unit;
   writing updates to the second storage unit so that the second storage unit has updates prior to the first storage unit;
   first multi-target mirroring updates written to the first storage unit, to both the second storage unit and a third storage unit;
   second multi-target mirroring updates written to the second storage unit, to both the first storage unit and the third storage unit;
   detecting a failure of a mirroring relationship of the first multi-target mirroring, from the first storage unit to the third storage unit; and
   in response to the detection, suspending an operational mirroring relationship of the second multi-target mirroring, from the second storage unit to the third storage unit.

16. The computer program product of claim 15 wherein the first multi-target mirroring updates written to the first storage unit, to both the second storage unit and a third storage unit includes:
   establishing a mirroring relationship from the first storage unit to the second storage unit;
   establishing a mirroring relationship from the first storage unit to the third storage unit;
   copying the first storage unit to the second storage unit; and
   copying the first storage unit to the third storage unit; and
   wherein the second multi-target mirroring updates written to the second storage unit, to both the first storage unit and the third storage unit includes:
   establishing a mirroring relationship from the second storage unit to the third storage unit; and
   establishing a mirroring relationship from the second storage unit to the first storage unit.

17. The computer program product of claim 16, wherein the operations further comprise:
   detecting a failure of the mirroring relationship from the second storage unit to the first storage unit;
   in response to the detection, shifting the writing of updates so that updates are written to the first storage unit so that the second storage unit no longer has updates prior to the first storage unit, and
   suspending the mirroring relationship from the second storage unit to the third storage unit.

18. The computer program product of claim 16, wherein the operations further comprise:
   detecting that the third storage unit is not synchronized to the first and second storage units; and
   in response to the detection:
      suspending the mirroring relationship from the first storage unit to the third storage unit;
      suspending the mirroring relationship from the second storage unit to the first storage unit;
      shifting the writing of updates so that updates are written to the first storage unit so that the second storage unit no longer has updates prior to the first storage unit,
      resynchronizing from the first storage unit to the third storage unit;
      re-establishing the mirroring relationship from the first storage unit to the third storage unit; and re-establishing the mirroring relationship from the second storage unit to the first storage unit.

19. The computer program product of claim 16, wherein the operations further comprise:
   suspending the writing of updates to both the first and second storage units;
   suspending the mirroring relationship from the first storage unit to the third storage unit;
   suspending the mirroring relationship from the second storage unit to the third storage unit;
   suspending the mirroring relationship from the first storage unit to the second storage unit;
   suspending the mirroring relationship from the second storage unit to the first storage unit; and
   shifting the writing of updates so that updates are written to the third storage unit.

20. The computer program product of claim 19 wherein the operations further comprise:
   multi-target mirroring updates written to the third storage unit, to both the first storage unit and the second storage unit.

21. The computer program product of claim 19 wherein the operations further comprise:
   resynchronizing from the third storage unit to the first storage unit;
   resynchronizing from the third storage unit to the second storage unit;
   re-establishing the mirroring relationship from the first storage unit to the third storage unit;
   re-establishing the mirroring relationship from the second storage unit to the third storage unit;
   re-establishing the mirroring relationship from the first storage unit to the second storage unit; and
   re-establishing the mirroring relationship from the second storage unit to the first storage unit.

\* \* \* \* \*